Patented July 12, 1949

2,476,072

UNITED STATES PATENT OFFICE 2,476,072

METHOD OF MAKING A TEA EXTRACT

Donald K. Tressler, Westport, Conn.

No Drawing. Application June 7, 1946,
Serial No. 675,311

3 Claims. (Cl. 99—77)

This invention concerns the preparation of a concentrated tea extract which can be prepared and stored, and employed by simple dilution to provide a beverage with the flavor and taste of a fresh brew.

Many proposals have been made for preparing tea extracts, but with the disadvantages of loss of flavor components, presence of excessive tannins, or presence of undesirable foreign matters.

For foodstuffs, no material foreign to the normal product should be present. To avoid expensive and complicated procedures of later removal, contacts with such foreign material should be avoided. Thus, the employment in preparing aromatic tea extracts, as heretofore proposed, of organic solvents such as acetone, petroleum ether, pentane, toluene, chloroform, carbon tetrachloride, ether, or alcohols, requires later separation of these; and such separation is difficult because volatile aromatic constituents of tea have volatilization points concurrent with those of such solvents so that fractionating distillation or condensation represents loss of the volatile aromatics which it is being sought to preserve in the extract.

In other previously proposed procedures, extractions have been described, with treatment of the extract by separative or purifying chemicals such as quick lime, calcium hydroxide, lead acetate or ferric chloride; but here also it is obvious that the introduced chemicals introduce conditions foreign to the normal brew and in some instances provide components injurious to health, and their final exclusion from the extract is necessary.

Tea as a beverage consists essentially of a water solution of water-soluble components, as is demonstrated by the absence of an oily layer at the surface of the brew. Brewed tea has flavor and taste characteristics. The flavor or odor characteristics, perceived by the olfactory senses, are largely due to volatile aromatic components; while the so-called taste characteristics of body, tannins, sweetness, are largely due to non-volatiles. In addition, caffein, thein, and like drug components are largely present as non-volatiles.

In the usual preparation of tea by steeping with hot water, it has been considered that a long time of contact of water and tea leads to the production of a bitter extract, and that this bitterness can be avoided by separating the tea before the "bitter principle" has been extracted. I have found, however, that by firstly recovering the volatile components, the later exposure for water extraction and concentration may be extended without producing bitterness in the rehydrated product.

Owing to the high volatility of the aroma of the tea and the relatively low solubility of the astringent flavoring components, the preparation of a tea concentrate is more complicated and difficult than the making of other beverage concentrates. If the concentrate is to be used in the making of either iced or hot tea, the difficulties are multiplied owing to the necessity of producing a concentrate which is easily soluble in both hot and cold water.

I have discovered a process of obtaining a concentrate which when mixed with hot water instantaneously produces hot tea which cannot be distinguished from tea freshly brewed by the conventional methods: Similarly, if iced water is mixed with the tea concentrate, excellent iced tea is produced. Obviously such a product has commercial value, since the use of such a concentrate greatly simplifies the making of both hot and cold tea.

I have found that two groups of brewed tea components, i. e. volatiles and non-volatiles, can be separately collected, wherewith the volatiles can be recovered in the form of an aqueous liquid, while the non-volatiles can be recovered in the form of a water-solution which readily lends itself to concentration without loss of valuable components. The two separate extracts or concentrates can then be joined as a composite extract having the components which upon later dilution excite the senses of smell and taste in the same manner as a freshly-prepared brew.

Briefly, the steps used in making the concentrate are the following: Tea, either with or without the addition of water, is subjected to steam distillation. A steam distillate is collected in quantity to hold the volatiles and to permit the remixing with the concentrated water extract. In practice, the weight of this steam distillate is 10 percent or more compared to the dry weight of the tea: the maximum for tea concentration is around 300 percent, a preferred range being around 45 and 50 percent, at which the remixture of steam distillate and concentrated water extract is easy, and the dilution of the mixture does not demand a far-driven concentration of the water extract. The total quantity of water to be left in the mixture, comprising the water condensed with the steam distillate and the residual water of the concentrated water extract, can be determined from the requirements of reduced bulk and weight of the product, the temperature conditions of remixing, the probable exposure of an opened container before the contents are consumed, the protective additives, etc. In general, if the product is to be opened and kept in a warm place, the water content should be high for better retention of aromatic volatile constituents; if the mixing of steam distillate and water-extract concentrate is at a high temperature level (e. g. 150 degrees F.), then a larger part of the total water can come from the steam condensate: when additives are used to prevent coarse granular crystallization of tannins, etc., then the amounts of water captured in the steam condensation and remaining in the concentration can each be held low so that a solid concentrate is produced. This steam distillate contains nearly all of the volatile flavoring components of the tea. The tea leaves are then extracted with water in quantity from one to twenty times the original weight of the tea, near the boiling point. The water extract is then evaporated in vacuo, preferably using 25 to 29 inches of vacuum, until the weight of the concentrate remaining is only one-half to three-fourths of the original weight of the tea used. Usually the water extracts are condensed to about 6 to 10 percent of the original weight of the extract. This heavy concentrated extract, which is rich in the non-volatile flavoring components of the tea (tannins, etc.) is mixed while still warm with the steam distillate previously obtained from the tea.

This product may be used as a concentrate without further treatment, but with highly concentrated conditions, the tannin and other slightly soluble components precipitate out and settle as a sludge which, although it dissolves readily in boiling water, is not easily and quickly soluble in cold water. I have found that the difficultly soluble components may be kept in a much more readily soluble colloidal form by either the addition of a small amount of a suitable non-toxic protective colloid which itself is preferably a component that is accepted for normal employment in other food products (e. g. either regular pectin or low methoxyl pectin may be used), or a relatively large amount of sugar or corn syrup. In either case the protective colloid or the sugar should be added to the warm tea concentrate which should then be stirred until the added substance has dissolved. The addition of sugar produces a smoother, more perfect solution which is desirable if there is no objection to the sweetness. Either the protective colloid or the sugar gives a product satisfactory for use in either hot or cold tea.

The use of sugar possesses another advantage since it increases the concentration of the product to the point where it does not ferment quickly after a jar of the product has been opened.

If sugar is not used and the product is not pasteurized, less steam distillate should be used so that the soluble solids content of the concentrate will be at least 25 percent, otherwise the product must be held under refrigeration to prevent very rapid spoilage by microorganisms.

Regardless of whether or not the product is sweetened with sugar, the concentrate should preferably be pasteurized, heat processed or sterilized to obtain a concentrate which may be kept for long periods. This may be carried out by heating the concentrate to 160° F., then filling into bottles, jars, cans or other containers, immediately closing hermetically the containers and inverting or placing the hot containers on their sides. Care must be taken to fill each container completely to avoid mold growth.

Another method of pasteurization is to fill the cool or warm product into containers, allowing headspace for expansion, then closing hermetically and processing them in a boiling water bath for a few minutes.

*Example 1*

The following is an example of the preferred method of making the sweetened concentrate.

100 g. Fine Broken Ceylon tea was subjected to "steam distillation" in dry form until 98 to 100 g. of distillate was obtained. In conducting the "steam distillation" the distilling flask was surrounded by boiling water and steam passed in rapidly, the entire operation required about five minutes. The major part of the aromatic components distill off rapidly as soon as the distillation flask and its contents are hot. The receiver was surrounded with ice cubes and the tube from the condenser led to the bottom of the receiving flask.

After the steam distillation had been completed, the tea was emptied into an earthenware vessel, using boiling distilled water to rinse the flask and remove all the tea. The total amount of boiling distilled water used for the first extraction was 700 ml. The earthenware vessel was placed in a boiling water bath and the tea was stirred at thirty second intervals for five minutes. Then the extract was poured through a strainer. The tea grounds were emptied into a double cheesecloth and lightly pressed, after which the grounds were returned to the vessel and extracted for three minutes with 300 ml. boiling distilled water. The tea extract was again decanted, and the tea grounds lightly pressed in the same double thickness cheesecloth. Again the grounds were returned to the vessel and finally extracted for two minutes with 200 ml. boiling distilled water. The extract was decanted and the tea grounds lightly pressed as before. The first extraction takes most of the soluble color matters. The major part of the total water extraction came with the first two waters; the total extract represented about 75 to 80 percent of the soluble solids which are extracted. The extractions and pressings were within a total time not exceeding 15 minutes but this time was not critical. All extracts were combined (including the pressings) and kept hot; 840 ml. extract was obtained. The hot extract was immediately strained through a double thickness of fine muslin, thereby removing much insoluble material which might cause the concentrate to be muddy. The extract was placed in a 3-liter distilling flask, which was in turn placed in a boiling water bath (on an electric hot plate) and evaporated in vacuo (27 to 28 inches) until the amount remaining in the flask was reduced to 65 to 70 grams. This concentrate was poured out and the flask was rinsed out with a little of the steam distillate. It is necessary to use the added distillate in warm condition, (but preferably below 150 degrees F.,) so that the otherwise insoluble tannin will be kept in solution during the mixing. It is also necessary to rinse out the flask a second time. The combined weight of the steam distillate and the concentrate was about 165 to 175 g., and had a "solids" content of about 15 to 16 percent. To this was added 270 g. granulated sugar and the mixture warmed slightly and stirred until the sugar had dissolved. The total "solids" content was 65.5 to 66 percent, essentially 60 percent being the added sugar.

The product was pasteurized by heating to 160 degrees F. in the inner compartment of a double boiler. When this temperature was reached the tea concentrate was filled into bottles or jars, taking care to fill each one completely. The containers were immediately closed hermetically. Little volatile loss occurred; and even this can be avoided by condensing and returning the effluent vapors.

One teaspoon of this concentrate mixed with six ounces of hot water produced a cup of tea possessing excellent flavor and aroma. When a teaspoonful of the concentrate was stirred into six ounces of cold water and one or two ice cubes added, a glass of excellent iced tea was obtained.

*Example 2*

The following example indicates how an unsweetened product was prepared:

100 g. Fine Broken Ceylon tea was subjected to "steam distillation" in dry form until 45 to 50 g. of distillate was obtained. In conducting the "steam distillation" the flask was surrounded by boiling water and steam passed in rapidly; the entire operation required less than five minutes. The receiver was surrounded with ice cubes, and the tube from the condenser led to the bottom of the receiving flask.

After the steam distillation had been completed, the tea was emptied into an earthenware vessel, using boiling distilled water to rinse the flask and remove all the tea. The total amount of boiling distilled water used for the first extraction was 700 ml. The earthenware vessel was placed in a boiling water bath and the tea was stirred at thirty second intervals for five minutes. Then the extract was poured through a strainer. The tea grounds were emptied into a double cheesecloth and lightly pressed, after which the grounds were returned to the vessel and extracted for three minutes with 300 ml. boiling distilled water. The tea extract was again decanted, and the tea grounds lightly pressed in the same double thickness cheesecloth. Again the grounds were returned to the vessel and finally extracted for two minutes with 200 ml. boiling distilled water. The extract was decanted and the tea grounds lightly pressed as before. All extracts were combined (including the pressings); and kept hot; 840 ml. extract was obtained. The hot extract was immediately strained through a double thickness of fine muslin, thereby removing much insoluble material which might cause the concentrate to be muddy. The extract was placed in a 3-liter distilling flask, which was in turn placed in a boiling water bath (on an electric hot plate) and evaporated in vacuo (27 to 28 inches) until the amount remaining in the flask was reduced to 55 to 60 grams. This concentrate was poured out and the flask was rinsed out with a little of the steam distillate. (It is necessary to use the distillate in warm condition, but not exceeding about 150 degrees F., so that the otherwise insoluble tannin will be kept in solution during the mixing). It is also necessary to rinse out the flask a second time. The combined weight of the steam distillate and the concentrate was about 105 g. To this was added 2 grams of low methoxyl pectin and the mixture warmed slightly and stirred until the pectin had dissolved. The total "solids" content of the concentrate was 27 percent, including the added pectin. Upon cooling to a temperature at which crystallization of the less soluble components occurs, the action of the protective colloid prevents the formation of a coarse mass; and hence the separated constituents are in a finely divided form permitting easy distribution and measuring of quantities of uniform character, and quick dissolution thereof when water is added.

Pectins, including low methoxyl pectin, are proper additions to food products, being encountered in the jellies prepared from jelly-forming fruits such as apple; and hence introduce no harmful or repugnant foreign substance.

The product was pasteurized exactly as described above for Example 1.

One-half teaspoonful of this concentrate mixed with six ounces of hot water produced a cup of tea possessing excellent flavor and aroma. When a half-teaspoonful of the concentrate was stirred into six ounces of cold water and one or two ice cubes added, a glass of excellent iced tea was obtained.

The extracts show excellent keeping qualities, even when frequently opened for inspection and sampling.

The above examples have set out the employment of a Ceylon tea, by way of comparison. Such dark-colored tea leaves are desirable in the production of extracts for making iced tea, because a dark color of the beverage upon the dilution with water and ice is desirable. The procedure is likewise feasible with other teas, such as green tea, and mixed green and dark tea.

The concentration of the water extract by vacuum distillation is illustrative of a procedure for eliminating excess water after the extract has been formed through treatment of the steam-distilled tea leaf residue with boiling water amounting to about 1 to 20 times the weight of the dry leaves, which with the illustrative use of 12 times the weight in boiling water represents a reduction to 6 to 10 percent of the original weight of the water extract. When the reduction of volume of the water extract brings it under about 75 percent of the weight of the original dry tea leaves, the product when cooled to room temperature (say 70–75 degrees F.) is a solid. In order to assume a homogeneous mixture of this concentrated water extract with the steam distillate, it is preferred to have the weight of the water concentrate not less than 50 percent of the weight of the dry tea. For bulk requirements of extracts, 200 percent of the weight of the dry tea is a useful maximum, for cases of low temperatures of mixing and low water content of the steam distillate. It is feasible to employ other than repeated batch extractions, such as counterflow extraction where the incoming boiling water encounters the extracted leaf residue immediately prior to the discarding of the latter, and then this enriched water passes forward into contact with successively fresher material: in such cases, the quantity of leaching or extracting water may be kept very low, as for example 100 to 500 percent by weight of the original dry tea leaves. The concentration likewise may be accomplished by other than vacuum distillation, such as by use of straight low temperature evaporation, drum concentration, freezing methods by forming and removing ice crystals, etc.

In Example 1, ordinary granulated sugar or sucrose was employed for increasing the "solids" content, and establishing a non-fermenting condition. It is likewise feasible to employ other agents such as the sugars present in corn syrup, levulose, fruit sugar, invert sugar, etc. Such sugars also have the effect of producing a sweetened beverage, when used in substantially the stated proportions, without requiring additional sweetening agent. In such cases, the product is particularly advantageous for preparing iced tea because the manipulation merely requires stirring the concentrated extract into water and pouring over ice cubes.

In general, the time of water contact with the tea leaves should be kept low: but, after the leaves have been removed therefrom, the water extract can be subjected to heating without difficulty.

It is obvious that the invention is not limited to the stated examples of practice, but may be executed in many ways within the scope of the appended claims.

What is claimed is:

1. The method of making a tea extract, which comprises steam distilling the tea leaves at essentially the temperature of boiling water and condensing an aromatic steam distillate amounting to about 50 to 100 percent of the weight of the leaves, extracting the leaf residue with boiling hot water in amount of about 8 to 15 times the weight of the dry leaves and separating the leaf residue from a water extract, concentrating the water extract until about 50 to 200 percent of the weight of the dry leaves remains, and mixing the distillate with the concentrate.

2. The method of making a tea extract, which comprises steam distilling the tea leaves at essentially the temperature of boiling water and condensing an aromatic steam distillate, extracting the leaf residue with boiling hot water essentially to color exhaustion and separating the leaf residue from a water extract, vacuum distilling the water extract to a still concentrate of about 50 to 200 percent of the weight of the leaves, mixing the distillate with the concentrate, and adding about 2 percent of a soluble pectin.

3. The method of making a tea extract, which comprises steam distilling the tea leaves at essentially the temperature of boiling water and condensing an aromatic steam distillate, extracting the leaf residue with boiling hot water essentially to color exhaustion and separating the leaf residue from a water extract, vacuum distilling the water extract to a still concentrate of about 50 to 200 percent of the weight of the leaves, mixing the distillate with the concentrate, and adding a sugar to raise the solids concentration above the fermentation point.

DONALD K. TRESSLER.

REFERENCES CITED

The following references are of record in the file of this patent:

UNITED STATES PATENTS

| Number | Name | Date |
|---|---|---|
| 735,777 | Kato | Aug. 11, 1903 |
| 1,123,828 | Whitaker et al. | Jan. 5, 1915 |
| 1,251,359 | Etaix | Dec. 25, 1917 |
| 1,854,062 | Potter | Apr. 12, 1932 |
| 1,995,281 | Kuba | Mar. 19, 1935 |
| 2,235,700 | Eldred et al. | Mar. 18, 1941 |